(No Model.)  6 Sheets—Sheet 1.

J. D. CURTIS.
BARB FENCE MACHINE.

No. 297,679. Patented Apr. 29, 1884.

Witnesses:
John C. Dewey
Albert A. Barker

Inventor:
John D. Curtis

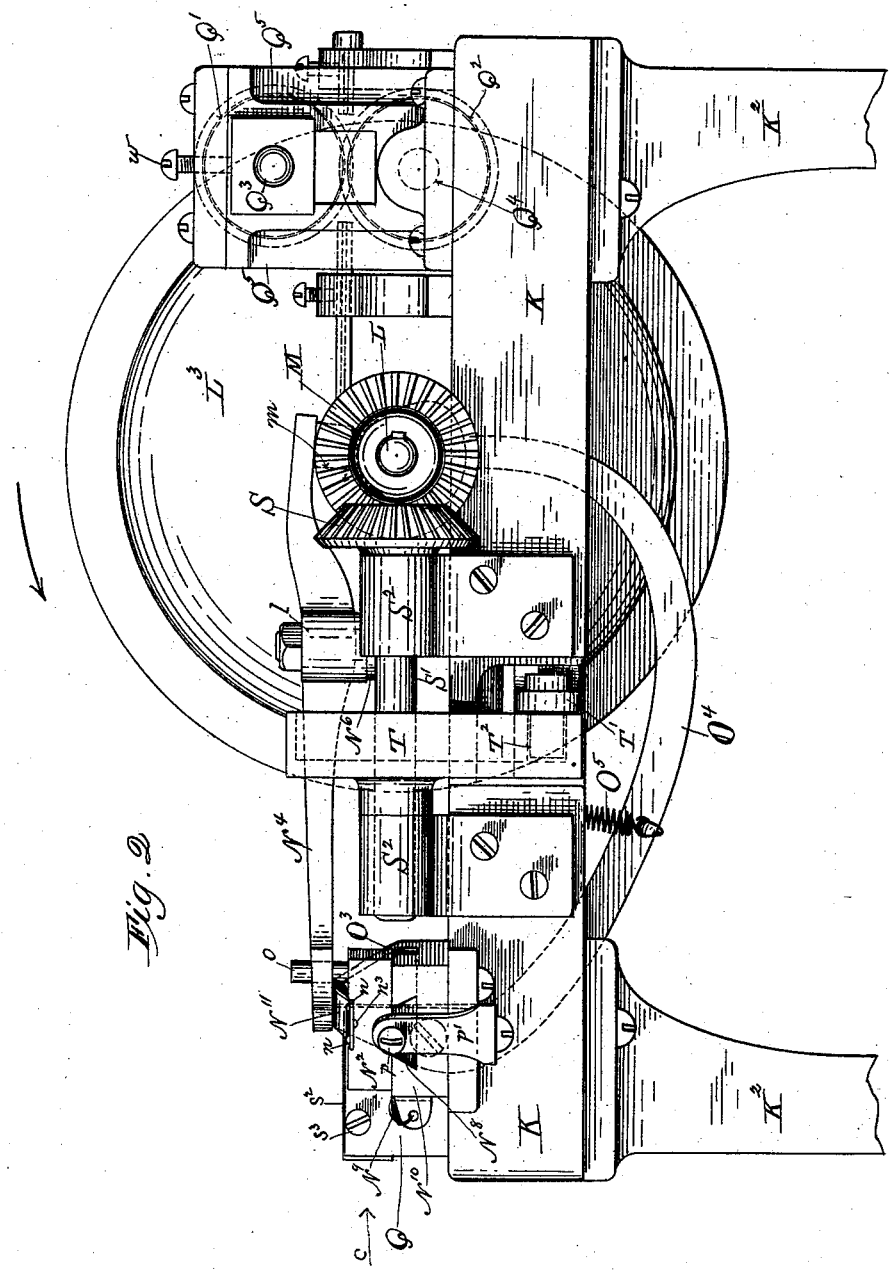

(No Model.)  J. D. CURTIS.  6 Sheets—Sheet 3.
BARB FENCE MACHINE.
No. 297,679.  Patented Apr. 29, 1884.
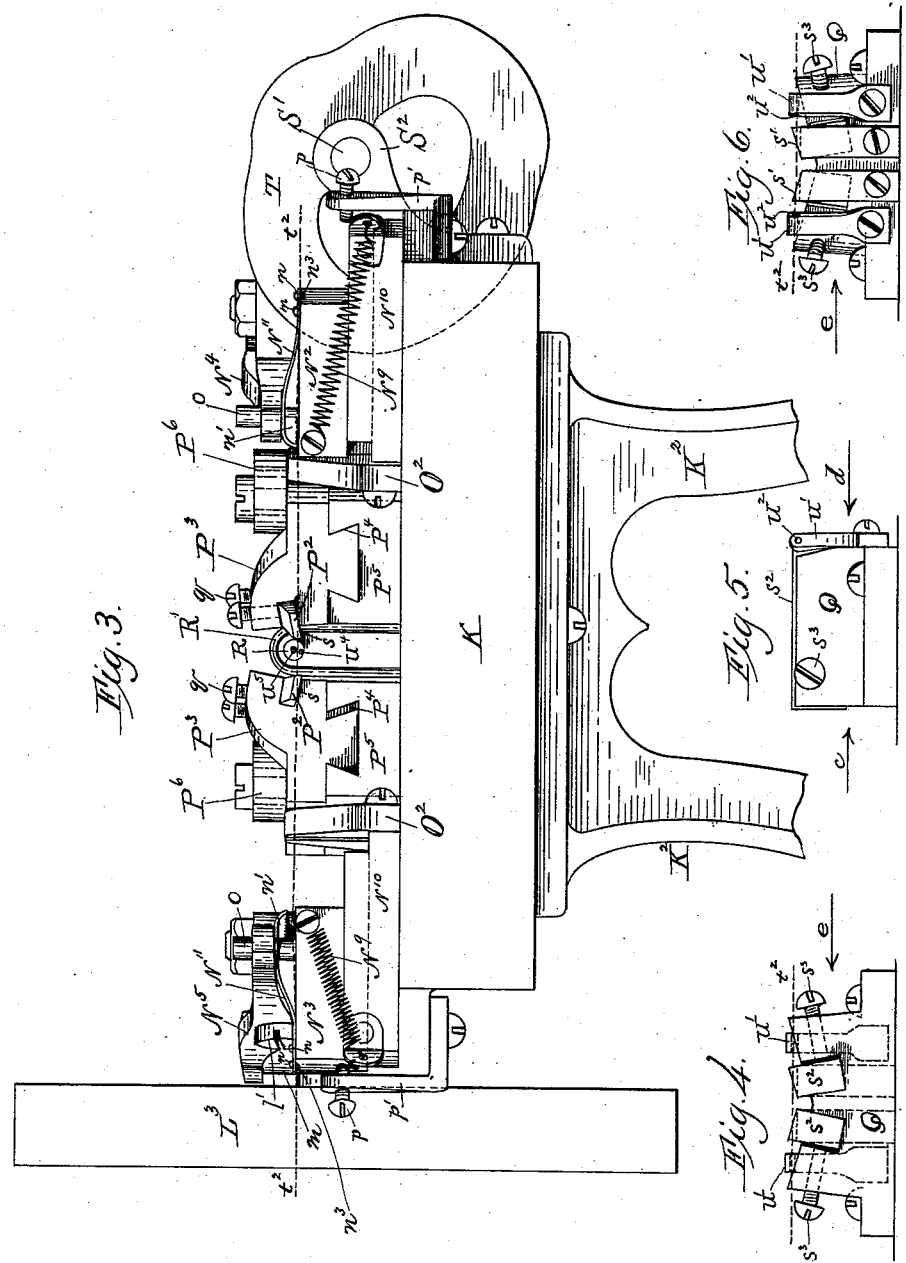

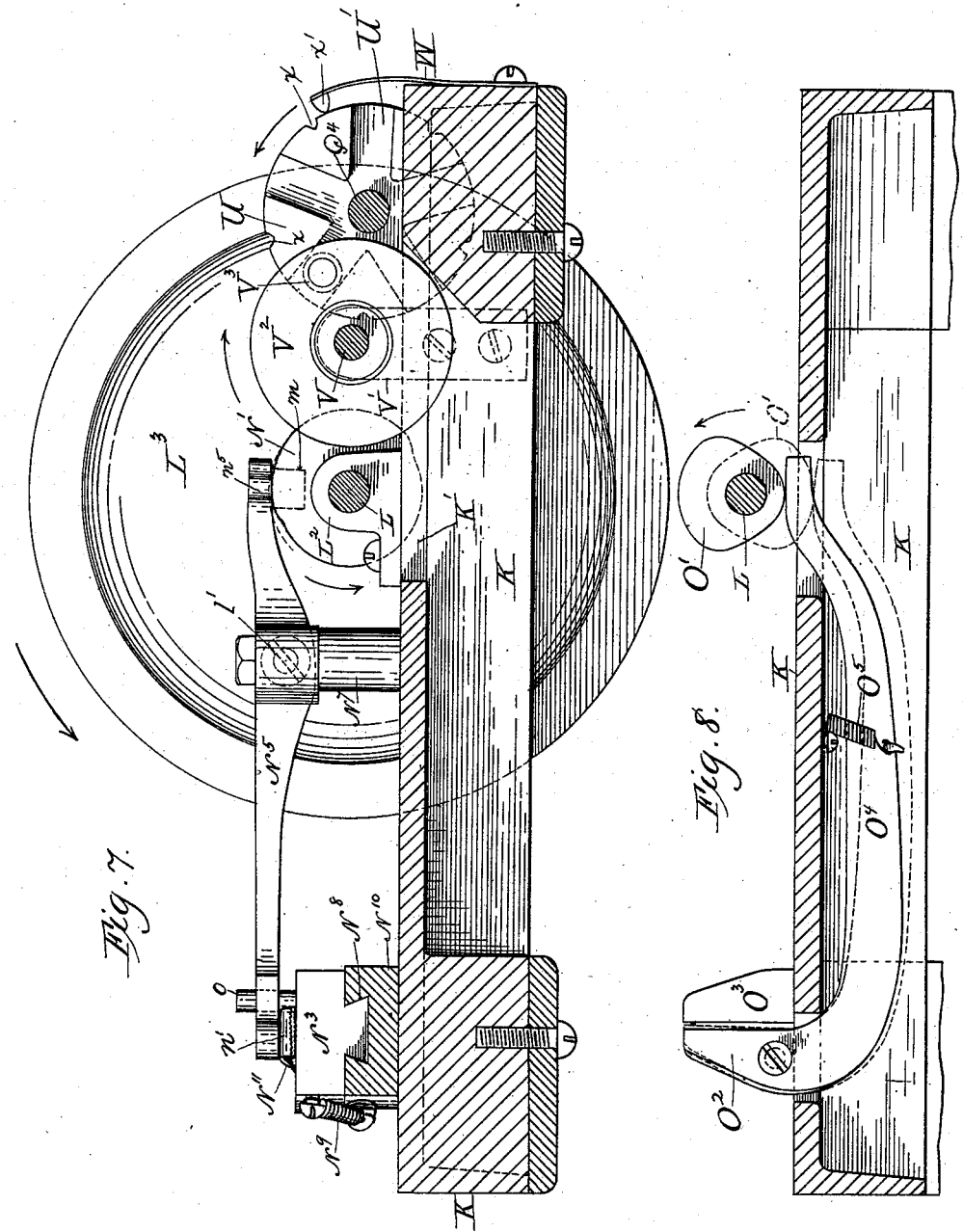

(No Model.)
J. D. CURTIS.
BARB FENCE MACHINE.
No. 297,679. Patented Apr. 29, 1884.
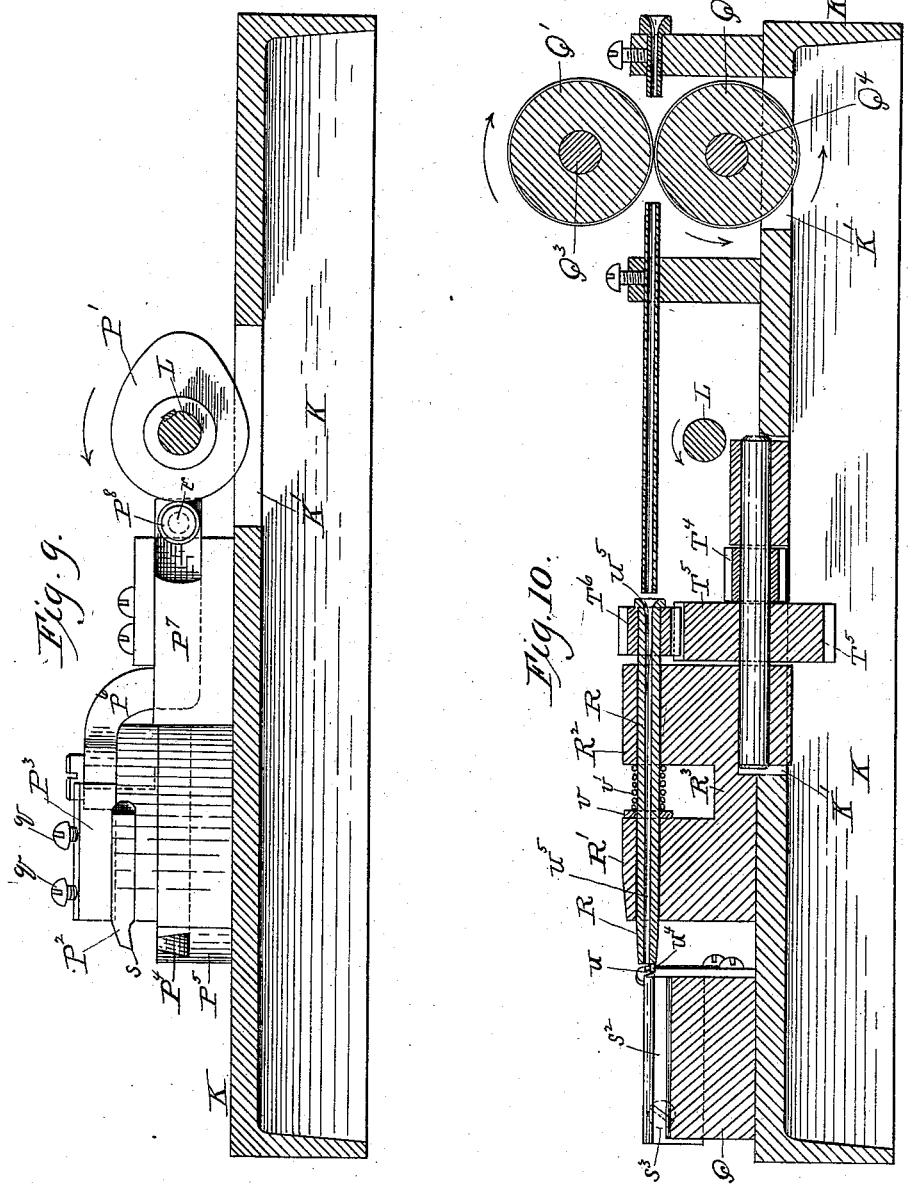

(No Model.)  J. D. CURTIS.  6 Sheets—Sheet 6.
BARB FENCE MACHINE.

No. 297,679.  Patented Apr. 29, 1884.

Witnesses:
John C. Dewey
Albert A. Barker

Inventor:
John D. Curtis

UNITED STATES PATENT OFFICE.

JOHN D. CURTIS, OF WORCESTER, MASSACHUSETTS, ASSIGNOR TO WASHBURN & MOEN MANUFACTURING COMPANY, OF SAME PLACE.

BARB-FENCE MACHINE.

SPECIFICATION forming part of Letters Patent No. 297,679, dated April 29, 1884.

Application filed August 1, 1883. (No model.)

*To all whom it may concern:*

Be it known that I, JOHN D. CURTIS, of the city and county of Worcester, and State of Massachusetts, have invented certain new and useful Improvements in Machines for Manufacturing Barbed-Fence Wire; and I do hereby declare that the following is a full, clear, and exact description of the same, reference being had to the accompanying drawings, forming a part of this specification, and in which—

Figure 1:
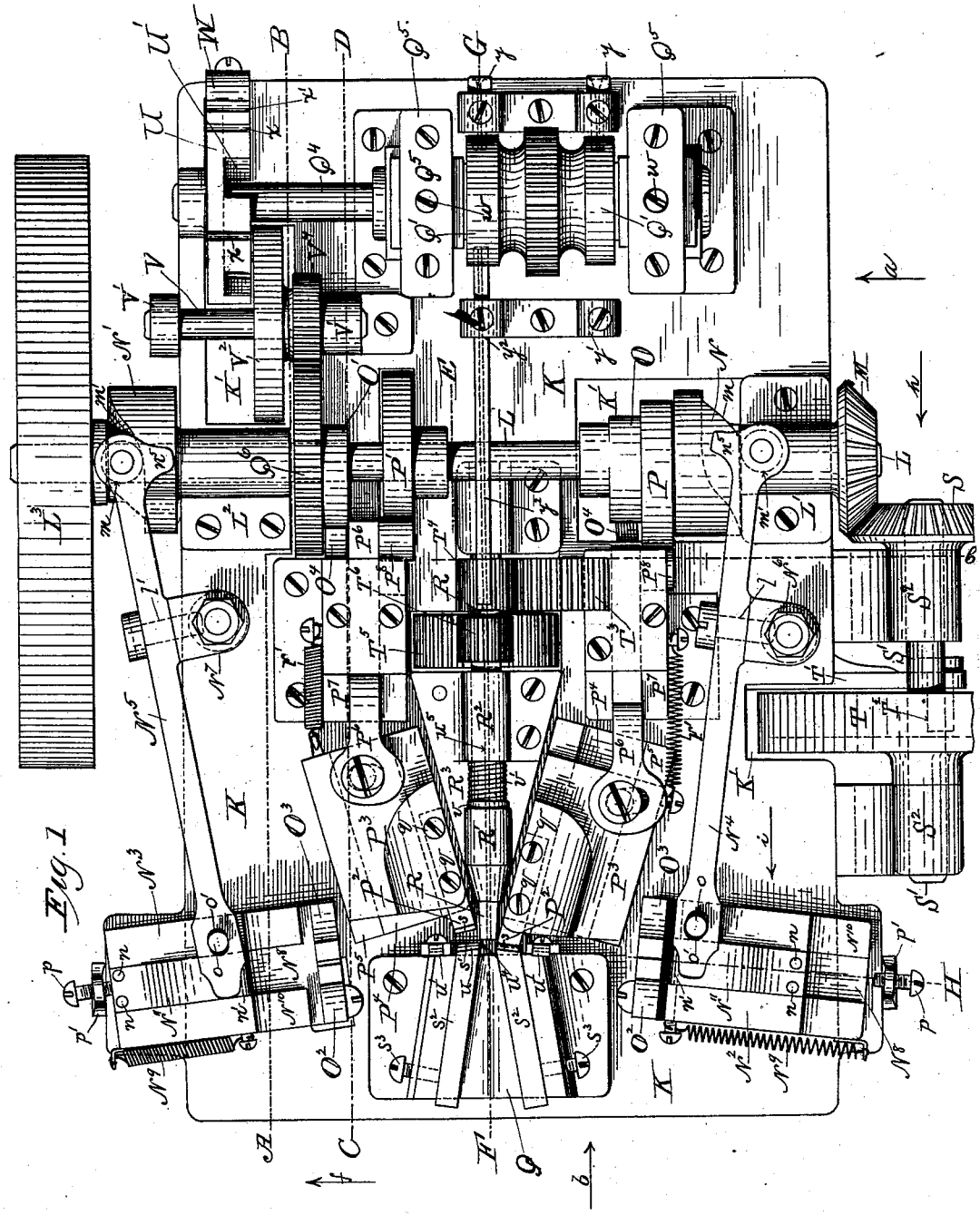
Figure 11:
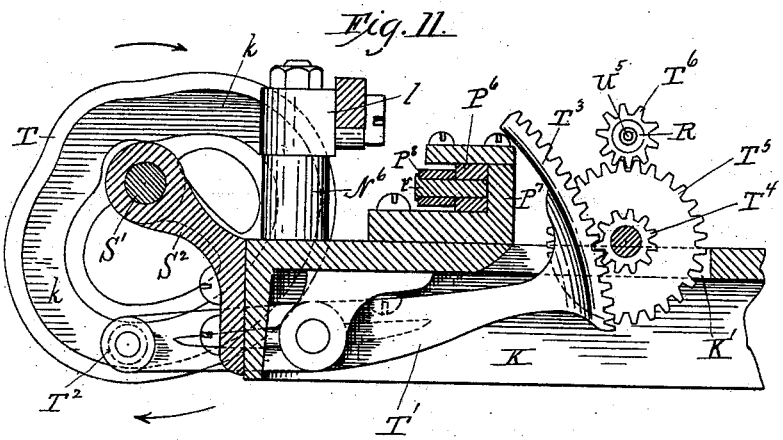
Figure 12:
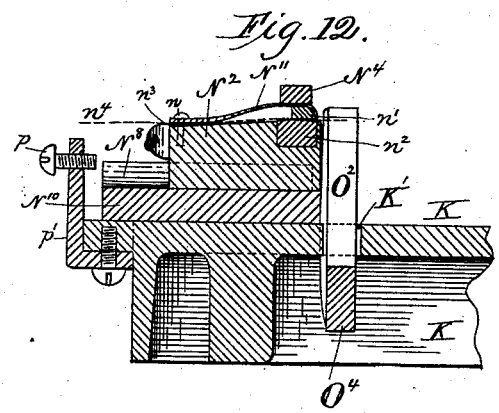
Figure 13:
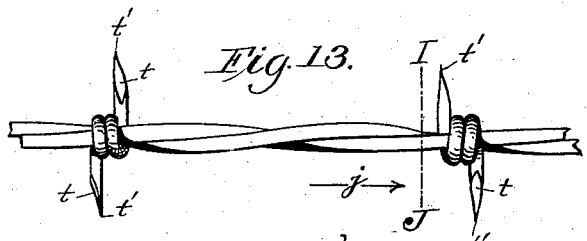
Figure 14:
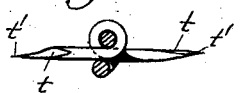

Figure 1 represents a top or plan view of a barb-fence machine with my improvements applied thereto. Fig. 2 represents a front side view of the machine, looking in the direction of arrow $a$, Fig. 1. Fig. 3 represents an end view of the machine, looking in the direction of arrow $b$, Fig. 1, with the die-block removed to more clearly illustrate the arrangement of the barb-wire cutters hereinafter more fully described. Figs. 4, 5, and 6 represent different views of the die-block, Fig. 4 being an outside end view looking in the direction of arrows $c$, Figs. 2 and 5; Fig. 5, a side view looking in the direction of arrow $e$, Fig. 4, and Fig. 6 an inner end view looking in the direction of arrow $d$, Fig. 5, the dies and barb-wire guides hereinafter described also being shown attached to said block in the above figures. Fig. 7 represents a vertical longitudinal section through the machine, taken on line A B, Fig. 1, looking in the direction of arrow $f$, same figure. Fig. 8 represents a vertical longitudinal section through the machine, taken on line C D, Fig. 1, looking in the direction of arrow $f$, same figure, showing a side view of the gripping device for holding the barb-wire during the cutting operation after it has been coiled about the main wire, as hereinafter more fully described. Fig. 9 represents a vertical longitudinal section taken at the point indicated by line E, Fig. 1, looking in the direction of arrow $a$, same figure, showing a side view of one of the movable cutters, its holding-block, and mechanism for operating the same, hereinafter more fully explained. Fig. 10 represents a central vertical longitudinal section through the machine, taken on line F G, Fig. 1, looking in the direction of arrow $a$, same figure, showing a section through the die-block before referred to, the barb-coiling spindle, feed-rolls, and other parts hereinafter more fully described. Fig. 11 represents a vertical transverse section taken on line $g$, Fig. 1, looking in the direction of arrow $h$, same figure, showing a side view of the mechanism for operating the barb-coiling spindle, as hereinafter more fully described. Fig. 12 represents a central vertical longitudinal section through the barb-wire guiding and holding device, taken on line H, Fig. 1, looking in the direction of arrow $i$, same figure. Fig. 13 represents a side view of a short section of barbed-wire fencing, full size, such as is manufactured by my improved machine; and Fig. 14 represents a cross-section of said barbed wire, taken on line I J, Fig. 13, looking in the direction of arrow $j$, same figure.

The object of my invention is to utilize, in a barb-fence machine, the coiling motion of the coiling-spindle in each direction, so that a barb or sets of barbs will be coiled upon the main fence wire or wires by each rotary motion of the coiling-spindle.

To enable those skilled in the art to which my invention belongs to make and use the same, I will proceed to describe it more in detail.

In the drawings, K represents the bed of the machine, which is cut out at the points K' to admit of the operation of the several parts extending below its top surface, and is supported upon legs or standards $K^2$, fastened to the floor.

The main shaft L of the machine is arranged to turn in suitable bearings, L' $L^2$, fastened to the bed K. To the outer end of said shaft is fastened the large driving wheel or pulley $L^3$, which may be connected by an endless belt with any suitable and convenient mechanism.

Upon the main driving-shaft L is secured the bevel-gear M, cams N N' O O' P P', and large spur-gear $Q^6$. Power is transmitted from bevel-gear M to operate the coiling-spindle R by means of bevel-gear S, with which it engages, which is secured to one end of short shaft or journal S', turning in bearings $S^2$ $S^2$, secured to the bed K, through cam T, secured upon said shaft S', rocking lever T', provided at one end with a friction-roll, $T^2$, and at the other end with a gear-segment part, $T^3$, pinion $T^4$, spur-gear $T^5$, and pinion $T^6$, secured to the inner end of the coiling-spindle R, all of which mechanism is fully illustrated in Fig. 11 of the drawings.

The cam T, as will be observed by said figure, is provided with a groove, $k$, in which the friction-roll $T^2$ travels when said cam is rotated, thereby raising and lowering the segment end $T^3$ up and down, which operation turns the coiling-spindle R, through the gear and pinions before referred to, toward the right or left direction, and thus coils first one barb-wire and then the other upon the main wire in rapid succession as the coiling-spindle is rotated in each direction, the barb-wire being fed in alternatively from each side of the machine, as will be hereinafter more fully described. The cam T is made in such a form that the segment $T^3$—which, in connection with the other parts of the machine, operates the coiling-spindle R—has two periods of rest, holding said spindle stationary a sufficient time to allow the barb-wire and the main wire to be fed into their proper positions.

Cams N N', near the ends of main shaft L, are for operating the mechanism for guiding and feeding forward the barb-wires into the machine. Connection is made between said cams N N' and the sliding blocks $N^2$ $N^3$ by means of hinged rocking levers $N^4$ $N^5$. Said levers are hinged at $l$ $l'$ to upright standards $N^6$ $N^7$, fastened to the bed K, which admits of the levers being rocked up and down, as well as swung around laterally, for the purposes hereinafter described. The lateral swinging motion is produced by a friction-roll, $m$, upon the inner end of each lever, which travels over the side cam-surface, $m'$, of its respective cam, and serves to move the barb-wire-holding blocks $N^2$ $N^3$ forward in the stationary ways $N^8$ $N^8$, said forward movement feeding the barb-wire into the machine the necessary distance to wrap the coils around the main wire and form the barb-points. The said blocks are forced or drawn back into their normal positions, ready for feeding forward the barb-wires for the next succeeding barbs, by the contraction of spiral springs $N^9$, which are fastened at one end to the forward ends of the sliding blocks $N^2$ $N^3$ and at their opposite ends to the stationary blocks $N^{10}$, in which the ways $N^8$ are formed.

The sliding blocks $N^2$ $N^3$ are each provided with a barb-wire-holding device, for gripping the barb wire to feed it forward when the blocks are moved forward, as before described. Said device consists of a flat spring, $N^{11}$, in this instance fastened at $n$ $n$, and provided with an enlarged inner end, $n'$, which is roughened upon its lower side to facilitate holding the barb-wire when it is depressed, so as to bear upon the surface of said wire; and to further facilitate the holding operation, the top surface of the block is raised a little just under the head $n'$, and also roughened, or a small block, $n^2$, inserted in the block at that point, to serve the purpose stated. (See Fig. 12 of the drawings.) A guide-opening, $n^3$, is formed in each of the blocks $N^2$ $N^3$, in this instance under the outer end of the springs $N^{11}$, to admit of the passage of the barb-wire under said springs and between the jaws before described, as shown by dotted lines $n^4$ in said Fig. 12. The springs $N^{11}$ are depressed to grip the barb-wires, as before described, by the depression of the outer ends of levers $N^4$ $N^5$, which is done by the action of the cams N N' upon the inner ends of said levers, an ear or projection, $n^5$, being formed on each lever which lies upon the surface of its respective cam, thus imparting its action to the lever, as aforesaid. The outer ends of the levers $N^4$ $N^5$ are kept in their proper position upon the blocks $N^2$ $N^3$ by means of pins $o$, fastened in said blocks, which pass up through vertical slots $o'$, (see Fig. 1,) formed in the ends of the levers $N^4$ $N^5$. The backward movement of the blocks $N^2$ $N^3$ is governed, when sprung back, by the spiral springs $N^9$, before described, by means of adjustable set-screws $p$, which may be turned in or out in the upright bearings $p'$, fastened to bed K.

The purpose of cams O O' on shaft L are to operate the movable jaws $O^2$, so as to grip the barb-wires between said jaws and the stationary jaws $O^3$ while said barb-wires are being coiled about the main wire, as will be hereinafter described. The movable jaws $O^2$ are formed upon or fastened to one end of the levers $O^4$, while their other ends are made to bear against the cam-surfaces of their respective cams, so that the action of the cams will be imparted to them, and the levers are drawn back by means of spiral springs $O^5$, which are secured at one end to said levers and at the other end to some stationary part of the machine. The lever shown in Fig. 2 is curved or extended down lower than the other lever upon the opposite side of the machine, for the purpose of escaping contact with rocking lever $T'$ when the parts are in operation. The stationary jaws $O^3$ are in this instance formed upon the blocks $N^{10}$; but, if preferred, they may be attached to or formed upon the bed K.

The cams P P' on shaft L are for the purpose of operating the movable cutters $P^2$ of the machine, which cut the barb-wires to form the barbs, as hereinafter described. Said cutters $P^2$ are fastened in the sliding blocks $P^3$ by means of set-screws $q$. Said blocks are fitted to slide forward in stationary blocks $P^5$, secured to the bed K. They are forced forward to cut the barb-wires by their respective cams P P' through the medium of angular levers $P^6$, attached to the rear ends of the blocks, and fitted to slide back and forth in ways formed in the stationary blocks $P^7$, and by means of friction-rolls $P^8$, against which said cams bear. Said rolls are fitted to turn on studs or pins $r$, fastened in the sides of levers $P^6$. The blocks $P^3$ and cutters $P^2$ are in this instance drawn back into their normal positions after each cutting operation by means of spiral springs $r'$, (see Fig. 1,) fastened at one end to stationary blocks $P^7$, and at the other end to the rear ends of said sliding blocks. The barb-wires are cut to form the barbs by passing the cutting-edges $s$ of the movable cutters $P^2$ forward past and in close contact with the cutting-edges $s'$ of the stationary cutters or dies $s^2$, which are fastened in the stationary block Q, fastened to bed K. The cutters being arranged at an angle, as shown in Figs. 3, 4, 5, and 6, the barb-wires are cut upon a corresponding angle, $t$, (see Fig. 13,) to form the barb-points $t'$, said barb-wires being fed into the machine upon a level or horizontal plane, as indicated by dotted lines $t^2$, Figs. 3, 4, and 6, and dotted line $n^4$, Fig. 12 of the drawings. In this instance, just back of the cutting-edges $s'$ of the stationary cutters $s^2$ are formed guiding-grooves $u$, which serve the purpose of properly guiding the barb-wires between the coiling pin or finger $u^4$ and the main wire when said barb-wires are alternatively fed forward to be coiled upon the main wire and cut off, as hereinafter described. Guides $u'$, secured to die-block Q, and having guide holes or openings $u^2$ for facilitating the aforesaid guiding operation, are also, in this instance, employed. The coiling-spindle R is fitted to turn in bearings $R'$ $R^2$ of stationary block $R^3$, secured to bed K. Next to bearing $R'$ is secured a ring or collar, $v$, upon the coiling-spindle R, and between said ring or collar and the bearing $R^2$ is arranged, over said spindle, a spiral spring, $v'$. The purpose of the former is to govern the forward movement of the spindle, and of the latter to produce a constant forward pressure, thus giving to said spindle a backward springing motion, so that the barb-wire may be properly coiled upon the main wire by the coiling-finger $u^4$.

In the operation of coiling the barb-wire upon the main wire, the barb-wire is first fed forward from one side of the machine between the coiling-finger $u^4$ and the main wire the proper length to form the barbs, the main wire being fed forward, as hereinafter described, through a central longitudinal opening, $u^5$, formed in the coiling-spindle R. Said coiling-spindle is then turned by the mechanism before described, and the coiling-finger $u^4$, by its rotary motion, coils the barb-wire around the main wire spirally backward toward the center of the machine, the spindle R being forced backward as the coil is formed by the pressure produced against its end by said coiling operation, the spiral spring $v'$, before referred to, admitting of this backward movement. After the coil is finished, with the free end of the barb-wire extending out upon the opposite side to form one of the barb-points, the undetached portion upon the other side is cut apart from the barb-wire to form the other barb-point by passing the movable cutter past its stationary cutter, as before described. In practice the barb-wires are coiled twice around the main wire by the coiling-finger $u^4$. After a barb has been coiled upon the main wire and cut off, as above described, the main wire and barb-wire upon the opposite side of the machine are immediately fed forward, and the next barb is coiled around the main wire by the reverse motion of the coiling-spindle R, thus utilizing the motion of the spindle in each direction to coil a barb on the main wire, as before described. The main wires are fed into and through the machine and twisted together as fast as the barbs are coiled upon the central strand, as before described, in a similar manner to other barb-fence machines. In this instance I arrange the feed-rolls $Q'$ $Q^2$ on shafts or journals $Q^3$ $Q^4$, turning in suitable bearings formed in the housings $Q^5$. The journal of the upper rolls, $Q'$, is arranged in loose bearings, so that said rolls may be adjusted by means of set-screws $w$ $w$ to obtain a greater or less pressure upon the main wires passing between the two sets of feed-rolls, to feed them forward properly. The lower shaft or journal, $Q^4$, is extended out longer than the upper one, and to its outer end is secured a star-wheel, U, having radial slots $U'$ formed in its inner side, and a corresponding number of lateral notches, $x$, across its periphery.

Upon a short journal, V, turning in bearings $V'$ $V'$, fastened to bed K, is secured a wheel or disk, $V^2$, which is provided with a friction-roll, $V^3$, upon its outer side, near its periphery, and upon said journal, next to the disk or wheel $V^2$, is also secured a pinion, $V^4$, which engages with the spur-gear $Q^6$ on main driving-shaft L. Therefore, when said main shaft revolves, the disk $V^2$ is turned and the friction-roll V enters one of the radial slots $U'$ of star-wheel U, which in this instance turns said wheel one-fifth of a revolution, (the distance between one set of barbs and the next,) when the V-shaped head $x'$ of spring W enters one of the notches $x$, and holds the wheel in that position until the roll $V^3$ enters the next succeeding slot $U'$ and turns the wheel another one-fifth of a revolution for the next succeeding barb.

Any other device for feeding the main wires forward may be used in connection with my improvements, if preferred, and more than one coiling-spindle may be used, and the barbs coiled on both main wires, without departing from the principle of my invention.

The parts marked $y$ $y$ $y'$ $y^2$ represent guides for conducting the two main wires to and from the feed-rolls $Q'$ $Q^2$. The guide $y^2$ for the central main wire, upon which the barbs are secured, consists, in this instance, of a long pipe or tube extending from the feed-rolls, which feed forward said main wire to nearly the end of the coiling-spindle R, thus forming in connection with the longitudinal opening $u^5$ in said coiling-spindle a continuous guide from the feed-rolls to the point at which the barbs are coiled on. The other main wire, which is fed forward by the other set of feed-rolls, is conducted over the several parts of the machine in a parallel line to the central main wire by suitable guides, (not shown in the drawings,) and as fast as the central wire is barbed and fed forward the two wires are intertwisted to form one double-barbed strand by means of a suitable twisting-machine arranged at a short distance from the end of the barbing-machine.

As said twister does not constitute a part of my present invention, I have not shown it in the drawings.

Having described my improvements in machines for manufacturing barbed wire, what I claim therein as new and of my invention, and desire to secure by Letters Patent, is—

1. In a machine for manufacturing barbed fence-wire, means for supporting and feeding the main wire and means for supporting and feeding the barb-wires, in combination with the coiling-spindle and means for operating the same, all arranged and operating substantially as described, whereby the barb-wire is coiled upon the main wire by the rotary movement of the coiling-spindle in each direction, substantially as shown and described.

2. In a barb-fence machine, the combination, with the coiling-spindle, of alternately-acting barb-wire-feeding devices placed on opposite sides of the coiling-spindle, substantially as shown and described.

3. In a machine for barbing fence-wire, the combination, with the coiling-spindle, of movable and stationary cutters, placed on opposite sides of the coiling-spindle, for cutting off the barb-wires, working alternately, substantially as shown and described.

4. In a machine for barbing fence-wire, the combination, with coiling-spindle, of alternately-acting barb-wire-feeding devices, placed on opposite sides of the coiling-spindle, and alternately-working movable and stationary cutters placed on opposite sides of the coiling-spindle, substantially as shown and described.

JOHN D. CURTIS.

Witnesses:
JOHN C. DEWEY,
ALBERT A. BARKER.